United States Patent [19]

Hess et al.

[11] 4,079,024

[45] Mar. 14, 1978

[54] FREE-FLOWING UNSATURATED POLYESTER MOULDING COMPOSITIONS HARDENABLE WITH VERY LITTLE SHRINKAGE

[75] Inventors: Bernhard Hess, Kapellen near Moers; Karl Raichle; Ludwig Bottenbruch, both of Krefeld; Karl-Heinz Ott, Leverkusen; Hansjochen Schulz-Walz, Meerbusch; Oskar Walter, Krefeld, all of Germany

[73] Assignee: Bayer Aktiengesellschaft, Germany

[21] Appl. No.: 701,690

[22] Filed: Jul. 1, 1976

Related U.S. Application Data

[63] Continuation of Ser. No. 540,076, Jan. 10, 1975, abandoned.

[30] Foreign Application Priority Data

Jan. 17, 1974 Germany .............................. 2402178

[51] Int. Cl.$^2$ .......................... C08L 1/26; C08L 67/06

[52] U.S. Cl. .................................. 260/16; 260/17 R; 260/40 R; 260/857 PE; 260/857 G; 260/857 D; 260/862

[58] Field of Search ......... 260/862, 40 R, 16, 857 PE

[56] References Cited

U.S. PATENT DOCUMENTS

| | | | |
|---|---|---|---|
| 3,231,634 | 1/1966 | Wismer et al. | 260/862 |
| 3,577,478 | 5/1971 | Thorpe | 260/862 |
| 3,857,812 | 12/1974 | Nowak et al. | 260/862 X |
| 3,880,950 | 4/1975 | Hara et al. | 260/862 |
| 3,980,610 | 9/1976 | Conrad | 260/862 X |

*Primary Examiner*—Walter C. Danison
*Attorney, Agent, or Firm*—Connolly and Hutz

[57] ABSTRACT

Unsaturated polyester moulding compositions hardenable with low shrinkage which are free-flowing comprise a crystalline unsaturated polyester, a copolymerizable vinyl monomer and a graft-polymerized butadiene polymer.

5 Claims, 1 Drawing Figure

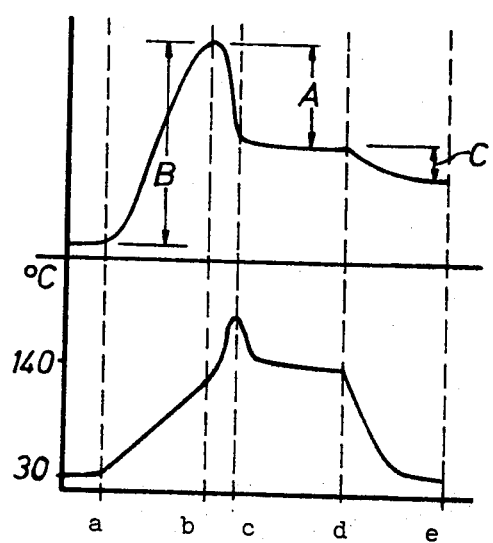

FREE-FLOWING UNSATURATED POLYESTER MOULDING COMPOSITIONS HARDENABLE WITH VERY LITTLE SHRINKAGE

CROSS-REFERENCE TO RELATED APPLICATION

This application is a continuation of application Ser. No. 540,076 filed Jan. 10, 1975 and now abandoned.

This invention relates to free-flowing moulding compositions which harden with very little shrinkage, based on unsaturated polyesters, polymerisable monomers and graft-polymerised elastomers.

Conventional unsaturated polyester resins undergo considerable shrinkage during polymerisation which is a serious disadvantage in the production of shaped articles having a satisfactory surface finish. It is known from numerous publications (German Published Specification Nos. 1,694,857; 1,803,345; 1,953,062; 2,051,663; 2,061,585, French Pat. No. 1,148,285) that polyester moulding compositions, with which certain thermoplasts have been mixed before hardening, can be hardened with very little shrinkage.

The above applications relate both to liquid casting resins and also to resins which have been thickened by the addition of fillers or thickeners and which, on account of their tackiness, are naturally unsuitable for the production of free-flowing polyester moulding compositions in the absence of other aids. These tacky resins can only be processed into free-flowing compositions by adding such large quantities of fillers that the resulting polyester compositions can no longer be processed in injection moulding machines, in addition to which their mechanical properties generally no longer comply with practical requirements.

According to German Published Specification No. 2,234,307 polyester moulding compositions which harden with very little shrinkage can be obtained in free-flowing form when they have the following composition:

(a) 30 to 70% by weight of an unsaturated crystalline polyester containing fumaric acid radicals and radicals of glycols corresponding to the general formula HO—CH$_2$—R—CH$_2$—OH, where R represents an alkylene of the formula (CH$_2$)$_z$ (z = 1 - 18) or symmetrical dialkyl derivatives of these alkylene radicals, the alkyl substituents being situated on the same carbon atom, or cycloalkylene radicals, (b) 20 to 75% by weight of styrene, and (c) 1 to 30% by weight of cellulose esters of organic acids, such as for example cellulose acetates, cellulose acetopropionates or cellulose acetobutyrates.

In order to minimise shrinkage of the polyester moulding compositions, it is generally necessary to add from 10 to 20% by weight of a thermoplast. Obviously the danger of adding thermoplastic polymers to crystalline unsaturated polyester resins in quantities as large as these, at least in the case of some thermoplasts (c), is that crystallisation speed is reduced and tacky resins are obtained which are unsuitable for the production of free-flowing polyester moulding compositions in the sense of the present application. However, these difficulties can be overcome by selecting special thermoplasts.

One skilled in the art would expect that the favourable mechanical properties which pure unsaturated polyester resins are known to have are considerably influenced by the addition of thermoplasts. Since, in addition, the shrinkage has a direct linear dependence upon the thermoplast content in conventional non-freeflowing, low-shrinkage polyester moulding compositions, satisfactory surface finishes and unchanged mechanical properties have hitherto appeared to cancel each other out. An ideal combination was apparently not within the realms of possibility.

It has now surprisingly been found that the disadvantages referred to above can be obviated by new polyester resin mixtures containing graft-polymerised elastomers as their shrinkage-reducing component.

Accordingly, the present invention relates to low-shrinkage moulding compositions based on unsaturated polyesters which are free-flowing even in the absence of fillers or chemical thickeners, containing A. 20 to 80% by weight and preferably 30 to 50% by weight, based on the sum of components A - C of a crystalline polyester based on α,β-unsaturated dicarboxylic acid radicals, containing fumaric acid radicals and radicals of glycols corresponding to the general formula HO—CH$_2$—R—CH$_2$—OH, in which R represents an alkylene of the formula (CH$_2$)$_x$ (x = 0 to 18), symmetrical dialkyl derivatives of these alkylene radicals, the alkyl substituents being situated on the same carbon atom, or cycloalkylene radicals, B. 18 to 70% by weight, preferably 30 to 60% by weight, based on the sum of components A - C of polymerisable vinyl monomers, C. 2 to 50% by weight, preferably 3 to 15% by weight, based on the sum of components A - C of a graft-polymerised elastomer, the percentages of A + B + C amounting to 100.

In the context of the invention, unsaturated polyesters are polycondensation products of fumaric and/or maleic acid or their ester-forming derivatives containing at least 70 mol-% of fumaric acid radicals based on the acid components, with the above-mentioned glycols, such as ethylene glycol, 1,3-propane diol, 1,4-butane diol, 1,5-pentane diol, 1,6-hexane diol, 1,10-decane diol, 1,18-octadecane diol, neopentyl glycol, 3,3-dimethyl-1,5-pentane diol and 1,4-hydroxy methyl cyclohexane. Particularly preferred diols are ethylene glycol, 1,3-propane diol, 1,4-butane diol and neopentyl glycol.

It is expressly pointed out at this juncture that maleic acid radicals inhibit the crystallisation of polyesters containing fumaric acid radicals to a far lesser extent than had been assumed. A maleic acid content of 30 mol % is not in the least troublesome.

If desired, up to 20 mol % of the symmetrical diols may be replaced by an equivalent quantity of monohydric or polyhydric alcohols or asymmetrical diols, and up to 20 mol % of unsaturated dicarboxylic acids or their ester-forming derivatives by an equivalent quantity of monocarboxylic acids or saturated dicarboxylic acids or their ester-forming derivatives (cf. J. Bjorksten et al., "Polyesters and their Application", Reinhold Publishing Corp., New York, 1956). Examples of those alcohols include monohydric alcohols having 1 to 6 carbon atoms, such as methanol, ethanol, propanol, butanol, cyclohexanol; glycerol, also trimethylol propane, pentaerythritol, allyl alcohol, diethylene glycol, triethylene glycol and partial etherification products of the aforementioned polyhydric alcohols, such as allyl, methallyl, ethallyl, chlorallyl and crotyl ethers. Examples of those acid components are o-phthalic acid, isophthalic acid, terephthalic acid, hexahydrophthalic acid, tetrachlorophthalic acid, endomethylene tetrahydrophthalic acid, hexachloroendomethylene tetrahydrophthalic acid, succinic acid, glutaric acid, adipic acid, pimelic acid, benzoic acid, acrylic acid and methacrylic acid or the ester-forming derivatives of these acids.

The incorporation of these esterification components lowers the melting point of the crystalline, unsaturated polyester, which can be advantageous to a certain extent, especially in the case of crystalline polyesters which normally have a very high melting point, because a very high melting point complicates the incorporation of fillers and other additives.

The dicarboxylic acid or its derivatives and the glycols are reacted at elevated temperature, preferably at temperatures in the range from 150° to 210° C, until a product having an acid number below 100 is obtained. The acid numbers of the unsaturated polyesters should be from 10 to 100, preferably from 20 to 70, whilst their hydroxyl numbers should be from 10 to 150, preferably from 20 to 100. The molecular weights of the polyesters may fluctuate within a wide range, although they are normally in the range from 500 to 5000 and preferably in the range from 1000 to 3000 (measured by vaporpressure osmosis in dioxane and acetone).

Polymerisable vinyl monomers suitable for the purposes of the invention include the unsaturated compounds normally encountered in polyester technology which preferably contain α-substituted vinyl groups or β-substituted allyl groups such as, for example, nucleus-chlorinated and -alkylated styrenes, the alkyl groups containing from 1 to 4 carbon atoms such as for example styrene, vinyl toluene, divinyl benzene, α-methyl styrene, tert.-butyl styrene, chlorostyrenes, vinyl acetate, optionally in admixture with small quantitites of acrylic acid and methacrylic acid and/or their esters having 1 to 4 carbon atoms in the alcohol component, acrylonitrile and methacrylonitrile, allyl esters such as allyl acetate, allyl(meth)acrylate, phthalic acid diallyl ester, triallyl phosphate and triallyl cyanurate.

Graft-polymerised elastomers suitable for the purposes of the invention are those which can be produced by polymerisation of (b) in the presence of (a),
(a) denoting 10 to 90% by weight, preferably 45 to 90% by weight, based on component C of a rubber-elastic butadiene polymer with up to 50% by weight, based on (a) of copolymerised styrene, acrylonitrile, methacrylonitrile and/or acrylic methacrylic acid esters having 1 to 18 carbon atoms in the alcohol component, and
(b) denoting from 90 to 10% by weight, preferably from 55 to 10% by weight based on component C of styrene or with styrene copolymerisable monomers such as, for example, acrylonitrile, methacrylonitrile, esters of acrylic acid and methacrylic acid having 1 to 18 carbon atoms in the alcohol chain, styrenes substituted by halogen atoms or aliphatic radicals having 1 to 6 carbon atoms, such as α-methyl styrene, tert.-butyl styrene, vinyl toluene, divinyl benzene, chlorostyrenes or mixtures thereof. The percentages of (a) + (b) amount to 100. Instead of using the optionally modified rubber-elastic butadiene polymers (a), it is also possible to use isoprene polymers, rubber-elastic polyacrylic acid esters, EPDM-rubbers and polypentenamer/polyhexenamer rubbers.

The graft-polymerised elastomers are produced in known manner either in solution or in emulsion. They can show any particular stereospecificity and, in the case of copolymers, any particular distribution of the monomer components in the polymer chain. The rubber-elastic butadiene polymers usually have a glass temperature [according to K. H. Illers and H. Breuer, Kolloid-Zeitschrift 176, 110 (1961)] of below 0° C, preferably below −30° C.

The mixtures according to the invention contain conventional polymerisation inhibitors, which prevent premature, uncontrolled gelation, in the usual quantities, preferably in quantities of from 0.001 to 0.1% by weight. Suitable polymerisation inhibitors include phenols and phenol derivatives, preferably sterically hindered phenols which contain alkyl substituents having 1 to 6 carbon atoms in both o-positions to the phenolic hydroxy group, amines, preferably secondary aryl amines and their derivatives, quinones, copper salts of organic acids, addition compounds of Cu(I)-halides with phosphites, such as for example 4,4'-bis-(2,6-di-tert.-butyl phenol), 1,3,5-trimethyl-2,4,6-tris-(3,5-di-tert.-butyl-4-hydroxy benzyl)-benzene, 4,4'-butylidene-bis-(6-tert.-butyl-m-cresol), 3,5-di-tert.-butyl-4-hydroxy benzyl phosphonic acid diethyl ester, N,N'-bis-(β-naphthyl)-p-phenylene diamine, N,N'-bis-(1-methyl heptyl)-p-phenylene diamine, phenyl-β-naphthyl amine, 4,4'-bis-(α,α-dimethyl benzyl)-diphenyl amine, 1,3,5-tris-(3,5-di-tert.-butyl-4-hydroxy hydrocinnamoyl)-hexahydro-s-triazine, hydroquinone, p-benzoquinone, toluhydroquinone, p-tert.-butyl pyrocatechlol, chloranil, naphthoquinone, copper naphthenate, copper octoate, Cu(I)Cl/triphenyl phosphite, Cu(I)Cl/trimethyl phosphite, Cu(I)Cl/trischloroethyl phosphite, Cu(I)Cl/tripropyl phosphite and p-nitrosodimethyl aniline.

The polyester moulding compositions according to the invention contain the usual quantities, preferably from 0.1 to 5% by weight, of polymerisation initiators such as, for example, diacyl peroxides such as diacetyl peroxide, dibenzoyl peroxide, di-p-chlorobenzoyl peroxide, peroxy esters such as tert.-butyl peroxy acetate, tert.-butyl peroxy benzoate, dicyclohexyl peroxy dicarbonate, alkyl peroxides such as bis-(tert.-butyl peroxy butane), dicumyl peroxide, tert.-butyl cumyl peroxide, hydroperoxides such as cumene hydroperoxide, tert.-butyl hydroperoxide, cyclohexanone hydroperoxide, methyl ethyl ketone hydroperoxide, ketone peroxides such as acetyl acetone peroxide, or azoisobutyrodinitrile.

Chemical thickeners may be added in quantities of from 0.1 to 10% by weight and preferably in quantities of from 0.5 to 5.0% by weight, based on the sum total of components A to C. In the context of the invention, chemical thickeners are the oxides and hydroxides of the metals of the Second Main Group of the Periodic System, especially magnesium and calcium, to which small quantities of water may optionally be added.

In addition, up to 300% by weight and preferably from 50 to 200% by weight, based on A to C of fillers may be added to the polyester compositions according to the invention. Suitable fillers are inorganic materials, such as calcium carbonate, silicates, aluminas, lime, carbon, asbestos, glass, metals, especially in the form of fibres, woven fabrics or mats and organic fillers such as cotton, sisal, jute, polyester, polyamide, again in the form of fibres of woven fabrics.

In addition, inorganic or organic pigments, dyes, lubricants and release agents such as zinc stearate, UV-absorbers, etc., may of course also be added in the usual quantities if desired.

The composition according to the invention is preferably homogenised at a temperature at which the unsaturated polyester exists in molten form, i.e. at temperatures in the range from 70° to 120° C, so that the solutions of the molten crystalline polyester in polymerisable vinyl monomers or the molten polyesters themselves are mixed with the graft-polymerised elastomers which may optionally be present in admixture with polymerisable vinyl monomers. All other fillers and additives may be added together with the individual components. Cooling of the mass to room temperature gives a readily grindable, non-agglomerating free-flowing moulding composition which can be heat-hardened in heated moulds to form low-shrinkage mouldings. A free-flowing granulate can also be produced for example by impregnating a glass fibre strand with the unstrengthened mixture under heat and after cooling to room temperature chopping the strand into a granulate.

In cases where the polymerisation initiator is added as described to the molten mixture according to the invention, care must be taken to ensure that its decomposition temperature is distinctly (approx. 20° C) above the melting temperature of the crystalline polyester. If the polymerisation initiator is present in solid, free-flowing form, it may also be added to the free-flowing mixture at room temperature, provided that the free-flowing mixture is suitably fine-grained.

The moulding temperature is preferably in the range from 120° to 180° C, and most preferably about 140° C. The moulding time is generally from 2 to 10 minutes, preferably about 4 minutes, for a moulding pressure of from 10 to 100 kp/cm$^2$.

The mixture according to the invention, for example with a vinyl monomer content of 40%, are compositions which are solid and free-flowing at room temperature, even in the absence of fillers, which is all the more surprising insofar as the ability of the crystallisable unsaturated polyesters to crystallise out in molten form from aromatic vinyl compounds to form a solid mass with inclusion of aromatic vinyl compounds is lost by the addition of conventional thermoplasts, for example polystyrene, polymethyl methacrylate or cellulose acetobutyrate, or takes too much time.

Considerably larger quantities of vinyl monomers may be added to the mixtures according to the invention, especially where graft polymers with a high rubber content are used, than to the crystalline polyesters without any addition of graft polymers, without any loss of fluidity. The compositions change into a paste-like form which is of particular advantage because the shrinkage of the mouldings can be further reduced by increasing the vinyl monomer content of the moulding compositions.

It has also been found that the shrinkage which the mouldings undergo is a minimum with a graft polymer content of from 5 to 10% by weight, based on the three-component system without any other additives. The degree of shrinkage increases again both with smaller and with larger quantities of graft polymer. This is all the more surprising since the shrinkage effect has a direct linear dependence upon the thermoplast content in conventional, non-free-flowing low-shrinkage moulding compositions, in which an addition of from 10 to 20% by weight of thermoplast is required to obtain minimal shrinkage. In view of the small quantity of graft polymer required, the polyester moulding compositions according to the invention retain the well-known, valuable properties of thermoplast-free polyester moulding compositions.

It has also been found that the freedom from shrinkage of hardened mouldings is dependent to a very large extent upon the styrene compatibility of the polyester used, styrene-incompatible polyesters giving moulding compositions with the least shrinkage, whilst styrene-compatible polyesters give moulding compositions with greater shrinkage.

The styrene compatibility or even styrene solubility of unsaturated polyesters is a well-known concept in the chemistry and technology of unsaturated polyester resins: cf. Johannes Scheiber, "Chemie und Technologie der kunstlichen Harze", vol. I, "Die Polymerisatharze", Wissenschaftliche Verlagsgesellschaft mbH, Stuttgart, 1961, 2nd. Edition, pages 563 et seq, more especially pages 566 and 571/572.

The styrene compatibility of unsaturated polyesters expressed in % by weight of unsaturated polyester, based on the total quantity of unsaturated polyester and styrene, is defined and determined as follows:

Unsaturated polyester is dissolved in styrene at 110° C in exactly the quantity required to obtain a clear solution of known concentration. More styrene is then added with stirring to the resulting solution until it clouds. The concentration, based on the total quantity of styrene and unsaturated polyester, of the unsaturated polyester in % by weight at the clouding point is defined as styrene compatibility.

The clouding point can be made easier to determine by using a black background during dilution with styrene. The styrene used preferably contains an inhibitor, for example 0.2% by weight of tert.-butyl pyrocatechol in order to prevent hazing by foreign substances, for example polystyrene, which would only complicate the determination.

The following example serves as an illustration:

E (g) = quantity weighed in (in grams), for example 20 g of the clear polyester solution in styrene, the solution having a concentration of P % of unsaturated polyester P (%) = the concentration (in % by weight), of unsaturated polyester dissolved to form a clear solution in styrene, for example 60%

S (g) = quantity of styrene in grams added to obtain the clouding point, for example 10 g $$\text{Styrene compatibility} = \frac{E(g) \cdot P(\%)}{E(g) + S(g)}$$

$$\text{for example } \frac{20 \text{ g} \cdot 60 \%}{20 \text{ g} + 10 \text{ g}} = 40 \%$$

By definition, therefore, styrene compatibility is greater the lower the percentage.

Experience has shown that the styrene compatibility of an unsaturated polyester is influenced by the polyester components involved in its synthesis, i.e. by the acids and hydroxy compounds used in the synthesis of the polyester.

Esterification components which cause styrene incompatibility are, for example, maleic acid and its anhydride, fumaric acid and ethylene glycol.

Esterification components which cause styrene compatibility are, for example, phthalic acid, isophthalic acid, tetrachlorophthalic acid, hexachloro-endomethylene tetrahydrophthalic acid or their anhydrides, 1,2-propane diol, 1,3-butane diol, neopentyl glycol and trimethylol propane allyl ether.

As already mentioned, the more styrene-incompatible the unsaturated polyester and the greater the quantity of styrene present in the mixture produces a lower shrinkage of hardened mouldings. Styrene-incompatible polyesters containing more styrene than corresponds to their styrene compatibility "repel" the styrene and give wet moulding compositions from which it is only possible to obtain unusable, bubble-containing and heavily distorted mouldings. These faults, together with the loss of fluidity, can be avoided by adding the graft-polymerised elastomers according to the invention. Elastomers with a high rubber content are most capable of binding the styrene repelled by the polyester. As can be seen from the Examples, mouldings based on these combinations are those with the lowest shrinkage.

The properties of the hardened polyester mouldings are influenced not only by the styrene compatibility of the polyester and the type and quantity of thermoplast added but also by processing which also determines the degree of shrinkage; cf. Schulz-Walz and O. Walter, Kunststoff-Rundschau, 1972, No. 11, page 592:

1. Mouldings in which the glass fibres are arranged in the moulding direction shrink to a far lesser extent than mouldings in which the glass fibres are arranged transversely of the moulding direction.
2. Shrinkage increases with increasing moulding pressure.
3. Surface gloss and smoothness increase with increasing mould temperature. However, if a certain temperature is exceeded, dull patches appear.
4. Surface gloss can be considerably increased by extending the moulding time.
5. The tendency towards speck formation is reduced to an extent which is greater, the more slowly the catalyst system reacts, i.e. the higher the initiation temperature of the catalyst.

To sum up, it can be said that the reaction-induced shrinkage of a low-shrinkage polyester resin is governed by pressure. This means not only that the degree of shrinkage differs according to the moulding pressure, but also that it varies within the moulding itself depending upon position, direction, glass fibre orientation or material thickness.

EXAMPLES AND COMPARISON TESTS

Percentages are percent by weight.

PRODUCTION OF THE UNSATURATED POLYESTERS (UP)

The unsaturated polyesters are obtained in known manner by melt condensation. They are stabilised with 0.02% by hydroquinone, based on the unsaturated polyester. The composition of the polyesters, and their characteristics, are set out in the following Table.

|  | UP 1 | UP 2 | UP 3 | UP 4 |
|---|---|---|---|---|
| Fumaric acid g | 1160 | 1160 | 1160 | — |
| Maleic acid anhydride g | — | — | — | 980 |
| Ethylene glycol g | 682 | — | — | — |
| 1,3-propane diol g | — | 798 | — | — |
| 1,4-butane diol g | — | — | — | 945 |
| Neopentyl glycol g | — | — | 1071 | — |
| Characteristics |  |  |  |  |
| Acid number [mg KOH/g] | 48 | 38 | 35 | 42 |
| Styrene compatibility | 71% | 38% | <2% | <2% |
| Crystallisation behaviour in solution in styrene |  |  |  |  |
| Clouding temperature (° C) | 63 | 98 | 85 | 93 |
| Solidification temperature (° C) | 57 | 90 | 83 | 74 |
| % fumarate (according to NMR-spectrum) | 100 | 100 | 100 | 73 |

Styrene compatibility was determined in test tubes in the same way as described above.

Crystallisation behaviour was determined as follows: 2 g of styrene containing 0.2% by weight of 4-tert.-butyl butyl pyrocatechol were dissolved at about 120° C in 8 g of molten, unsaturated polyester in a test tube (diameter 18 mm, length 180 mm), and the solution left to cool to room temperature while stirring with a thermometer. The temperature at which the solution became cloudy through the formation of the first few crystal seeds is called the clouding temperature, whilst the temperature at which the solution solidified is called the solidification temperature.

A graft-polymerised elastomer E 1, prepared from 80% of a polybutadiene rubber graft-polymerised in aqueous-emulsion with 18% of styrene and 2% of acrylonitrile, was used for the following tests.

The polybutadiene rubber used was a coarse-particle latex having an average particle size of from 0.25 to 0.65 μ, the grafting base, tested in the form of solid rubber, having a gel content of 80% by weight and a Mooney viscosity of 60 ML-4, as measured in accordance with DIN 53 523. The polybutadiene rubber was prepared by emulsion polymerisation at 45° to 80° C.

PRODUCTION OF THE 3-COMPONENT SYSTEMS

Group 1: Variation of the polyesters

To prepare the 3-component systems according to the invention, batches of 5 g of the graft-polymerised elastomer E 1 were impregnated with 40 g of styrene, containing 0.02% by weight of benzoquinone in dissolved form, the resulting mass was heated to 80° C and batches of 55 g of molten, unsaturated polyesters UP 1 to UP 4, heated to 110° C, were allowed to flow in with stirring. Cooling of the mixtures at the temperatures indicated produced solid, free-flowing compositions which are designated UP 1/E 1 to UP 4/E 1 and which represent the Examples of Group 1.

| Group 1: Example: | UP 1/E 1 | UP 2/E 1 | UP 3/E 1 | UP 4/E 1 |
|---|---|---|---|---|
| Solidification temperature: | 61° | 88° | 72° | 73° |

2-Component systems, in which the quantity of graft-polymerised elastomer E 1 was replaced by the unsaturated polyester for comparision with the 3-component systems according to the invention, were used for comparison tests. These comparison compositions are designated UP 1/V to UP 4/V and, hence, consist of 40% of styrene and 60% of unsaturated polyester.

Group 2: Variation of the graft-polymerised elastomers

In the following Examples, the system UP 3/E 1 was modified to the extent that elastomers E 2 and E 3, with the following compositions, were used instead of the graft-polymerised elastomer E 1:

|  | E 2 | E 3 |
|---|---|---|
| Polybutadiene rubber content: | 50 % | 12 % |

-continued

|  | E 2 | E 3 |
|---|---|---|
| Styrene content: | 36 % | 63 % |
| Acrylonitrile content: | 14 % | 25 % |

The composition of the samples containing these elastomers and their solidification temperatures are shown in the following Table:

| Examples | UP 3/E 1 | UP 3/E 2 | UP 3/E 3 |
|---|---|---|---|
| UP 3 content: | 55 % | 55 % | 55 % |
| Styrene content: | 40 % | 40 % | 40 % |
| E 1 content: | 5 % | — | — |
| E 2 content: | — | 5 % | — |
| E 3 content: | — | — | 5% |
| Solidification temperature | 72° C | 66° C | 67° C |

Group 3: Variation of the quantity of graft polymer E 1

In the following Examples, mixing of the sample UP 1/E 1 was modified to the extent that polyester UP 1 was increasingly replaced by graft polymer E 1.

| | Composition of Group 3: | | | |
|---|---|---|---|---|
| Example | UP 1/E 11 | UP 1/E 1 | UP 1/E 12 | UP 1/E 13 |
| UP 1 content: | 57 % | 55 % | 50 % | 45 % |
| E 1 content: | 3 % | 5 % | 10 % | 15 % |
| Styrene content: | 40 % | 40 % | 40 % | 40 % |

Group 4: Variation of the styrene content

In the following Examples, mixing of the sample UP 1/E 1 was modified to the extent that polyester UP 1 was increasingly replaced by styrene.

| | Composition of Group 4: | | | |
|---|---|---|---|---|
| Example | UP 11/E 1 | UP 12/E 1 | UP 1/E 1 | UP 13/E 1 |
| UP 1 content: | 80 % | 65 % | 55 % | 45 % |
| E 1 content: | 5 % | 5 % | 5 % | 5 % |
| Styrene content: | 15 % | 30 % | 40 % | 50 % |

PRODUCTION OF HARDENABLE, FREE-FLOWING POLYESTER MOULDING COMPOSITIONS

To assess the 3-component mixtures according to the invention, the compositions were melted at approximately 80° C in a heated kneader and homogeneously kneaded with the additives indicated below. Finally, the peroxide was added and the mixture subsequently cooled to room temperature, resulting in the formation of free-flowing hardenable compositions.

100.00 parts by weight of mixture according to the invention and comparison mixture
100.00 parts by weight of calcium carbonate
1.50 parts by weight of magnesium oxide
4.00 parts by weight of zinc stearate
1.65 parts by weight of iron oxide black
3.35 parts by weight of iron oxide red
0.75 parts by weight of tert.-butyl perbenzoate In the case of the samples containing the polyester UP 2, the mixture was mixed with the additives at 110° C and, instead of the tert.-butyl perbenzoate, dicumyl peroxide powder was added to the cooled, fine-particle mass at room temperature.

Reinforcing fibres were deliberately not added because, as already mentioned, they promote irregular shrinkage in view of the different orientation of the fibres.

After storage for 1 day at room temperature, the polyester moulding composition were moulded in a heated laboratory press to form cylindrical mouldings each weighing 12 g for a height of approximately 25 mm.

The mould used was in the form of an oil-heated and oil-cooled cylinder with an internal diameter of 20 mm which was closed by a piston at its upper and lower ends (Bosch-diesel-injection pump). The material was introduced at 30° C. The upper piston was loaded through a lever arm with a pressure of 25 and 50 kp/cm$^2$ and the mould heated to 140° C. The displacement of the upper piston was recorded as a function of time by means of an inductive displacement pick-up (cf. upper part of the graph). A point containing a thermocouple projected into the moulding from the lower piston. The temperature pattern obtained in the moulding as a function of time is shown in the lower part of the graph. After the exothermic reaction had adated i.e. after 7 minutes, the mould was cooled to 30° C.

The symbols used in the graph have the following meanings:

(a) Composition introduced, mould closed, composition heats and expands
(b) Composition has almost reached the moulding temperature reaction begins, composition shrinks through polymerisation-induced shrinkage
(c) Temperature maximum, reaction and polymerisation shrinkage largely over, mass cools to the temperature of the mould and shows limited heat shrinkage
(d) Mould is cooled, moulding shows heat shrinkage
(e) Room temperature reached A denotes the polymerisation-induced shrinkage,
B is the maximum linear expansion,
C is the heat-induced shrinkage.

A and B were associated by the following relation:
Relative shrinkage S (rel) = A . 100/B.

The value C was substantially the same in all tests and was ignored. Since in all samples the quantity and type of additives were kept constant, S (rel) provides a clear indication of the shrinkage properties of the mixtures according to the invention.

The relative shrinkage values found in the moulding compositions UP 1/E 1 to UP 4/E 1 according to the invention and in the corresponding comparison samples UP 1/V to UP 4/V are shown in groups in the following Table:

| | S (rel) of Group 1 (Variation of the polyesters) | |
|---|---|---|
| Samples | S (rel) under 25 kp/cm$^2$ moulding pressure | under 50 kp/cm$^2$ moulding pressure |
| UP 1/E 1 | 14 % | 19 % |
| UP 1/V | distorted | distorted |
| UP 2/E 1 | 44 % | 60 % |
| UP 2/V | 52 % | 65 % |
| UP 3/E 1 | 43 % | 61 % |
| UP 3/V | 62 % | 70 % |
| UP 4/E 1 | 47 % | 65 % |
| UP 4/V | 55 % | 68 % |

All the UP/E 1 moulding compositions show less relative shrinkage than the comparison samples UP/V.

UP/E 1 shows the least relative shrinkage on account of the poor styrene compatibility of the polyester UP 1.

| S (rel) of Group 2 (Variation of the graft-polymerised elastomers) | | |
|---|---|---|
| Examples | S (rel) under 25 kp/cm² moulding pressure | under 50 kp/cm² moulding pressure |
| UP 3/E 1 | 43 % | 61 % |
| UP 3/E 2 | 46 % | 56 % |
| UP 3/E 3 | 54 % | 67 % |
| UP 3/V | 62 % | 70 % |

All the samples show less relative shrinkage compared with the comparison sample UP 3/V.

| S (rel) of Group 3 (Variation of the quantity of graft polymer) | | |
|---|---|---|
| Example | S (rel) under 25 kp/cm² moulding pressure | under 50 kp/cm² moulding pressure |
| UP 1/E 11 | 28 % | 55 % |
| UP 1/E 1 | 14 % | 19 % |
| UP 1/E 12 | 23 % | 33 % |
| UP 1/E 13 | 32 % | 48 % |

Example UP 1/E 1, with a graft polymer content of 5% show lowest relative shrinkage. Smaller quantities of UP 1/E 11) and, in particular, larger quantities of graft polymer UP 1/E 13) produced distinctly higher relative shrinkage values.

| S (rel) of Group 4 (Variation of the styrene content) | | |
|---|---|---|
| Example | S (rel) under 25 kp/cm² moulding pressure | under 50 kp/cm² moulding pressure |
| UP 11/E 1 | 46 % | 76 % |
| UP 12/E 1 | 23 % | 49 % |
| UP 1/E 1 | 14 % | 19 % |
| UP 13/E 1 | 11 % | 12 % |

These Examples show distinctly decreasing shrinkage values with increasing styrene content of the mixtures.

We claim:

1. A low-shrinkage moulding composition containing polymerizable components, said polymerizable components consisting of
    (A) 20 to 80% by weight of a crystalline polyester which is the condensation product of fumaric acid or a mixture of furmaric acid and maleic acid containing at least 70 mol % of fumaric acid with a glycol of the formula

HO—CH₂—R—CH₂—OH wherein R is of the formula (CH₂)ₓ or a symmetrical dialkyl derivative thereof wherein the allkyl substituents are on the same carbon atom or a cycloalkylene radical, x being 0 to 18;
    (B) 18 to 70% by weight of a vinyl monomer which is polymerizable with (A) and
    (C) 2 to 50% by weight of a graft polymerized elastomer which consists of the polymerization product of 90 to 10% by weight of (b) in the presence of 10 to 90% by weight of (a), said (a) consisting of a rubber-elastic butadiene copolymer consisting of polymerized butadiene and up to 50% by weight of at least one copolymerized member selected from the group consisting of styrene, acrylonitrile, methacrylonitrile, acrylic acid ester and methacrylic acid ester, said esters having 1 to 18 carbon atoms in the alcohol and said (b) consisting of at least one member selected from the group consisting of styrene, acrylonitrile, methacrylonitrile, acrylic acid ester, methacrylic acid ester, said esters having 1 to 18 carbon atoms in the alcohol component, α-methylstyrene, tertiary butylstyrene, vinyl toluene, divinyl benzene and chlorostyrene.

2. A free flowing moulding composition hardenable with low shrinkage as claimed in claim 1 wherein up to 20mol % of the glycol or symmetrical dialkyl derivative of (A) is replaced by an equivalent quantity of a monohydric or polyhydric alcohol and/or up to 20 mol % of the fumaric acid or mixture of fumaric acid and maleic acid of (A) is replaced by an equivalent quantity of a monocarboxylic acid or a saturated dicarboxylic acid.

3. A free flowing moulding composition hardenable with low shrinkage as claimed in claim 1 which contains from 0.1 to 10% by weight, based on the combined weight of (A) plus (B) plus (C), of an oxide and/or hydroxide of a metal of Group IIA of the Periodic System.

4. A free flowing moulding composition hardenable with low shrinkage as claimed in claim 1 containing up to 300% by weight, based on the combined weight of (A) plus (B) plus (C), of one or more fillers selected from the group consisting of calcium carbonate, silicates, aluminas, lime, carbon, asbestos, glass, metals, cotton, sisal, jute, polyesters and polyamides.

5. A moulding hardened with low shrinkage and produced from the free flowing moulding composition of claim 1.

* * * * *